(12) United States Patent
Poulakis

(10) Patent No.: US 9,427,050 B2
(45) Date of Patent: Aug. 30, 2016

(54) FASTENING SYSTEM

(75) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 0 days.

(21) Appl. No.: 13/261,765

(22) PCT Filed: Jun. 12, 2012

(86) PCT No.: PCT/EP2012/002481
§ 371 (c)(1),
(2), (4) Date: Oct. 28, 2013

(87) PCT Pub. No.: WO2012/175173
PCT Pub. Date: Dec. 27, 2012

(65) Prior Publication Data
US 2014/0053377 A1    Feb. 27, 2014

(30) Foreign Application Priority Data

Jun. 18, 2011 (DE) .......................... 10 2011 104 886

(51) Int. Cl.
*A44B 18/00* (2006.01)
*F16B 5/07* (2006.01)

(52) U.S. Cl.
CPC ......... *A44B 18/0073* (2013.01); *A44B 18/0049* (2013.01); *F16B 5/07* (2013.01); *Y10T 24/2708* (2015.01)

(58) Field of Classification Search
CPC ........... A44B 13/0029; A44B 18/0049; A44B 18/0083; F16B 5/07; Y10T 24/2708; Y10T 24/275; Y10T 24/2758

USPC ....................... 428/99, 100; 24/306, 446, 452
See application file for complete search history.

(56) References Cited

U.S. PATENT DOCUMENTS

| | | | |
|---|---|---|---|
| 5,110,649 A | | 5/1992 | Morse et al. |
| 5,520,983 A | * | 5/1996 | Yamamoto et al. ........... 428/100 |
| 5,643,651 A | * | 7/1997 | Murasaki ....................... 428/100 |
| 5,669,120 A | * | 9/1997 | Wessels ............. A44B 18/0034 24/445 |
| 5,989,678 A | * | 11/1999 | Jacobson ....................... 428/100 |
| 7,390,057 B2 | * | 6/2008 | Autterson .......... A44B 18/0053 24/306 |
| 7,425,360 B2 | * | 9/2008 | Line et al. ........................ 428/99 |
| 7,971,325 B2 | * | 7/2011 | Line et al. ........................ 24/442 |

FOREIGN PATENT DOCUMENTS

| | | |
|---|---|---|
| DE | 10 2008 013890 A1 | 9/2009 |
| GB | 2 364 351 A | 1/2002 |
| WO | WO 2009/097950 A1 | 8/2009 |

* cited by examiner

*Primary Examiner* — Abigail Morrell
(74) *Attorney, Agent, or Firm* — Wenderoth, Lind & Ponack, L.L.P.

(57) ABSTRACT

A fastening system for mounting detachable covering components, like panels, on other components (17), like carriage parts (19), has at least one spacer (1) with a spacer body (3). One spacer body side can be attached to the covering component. The opposite side has an adhesive closure part (7) detachably engaged with a corresponding adhesive closure part (16) attached to the other component (17). At least on one border of the side of the spacer body (3) connected to the covering component, a flat mesh (21) abuts to enlarge the connection area between the covering component and the spacer (1).

14 Claims, 5 Drawing Sheets

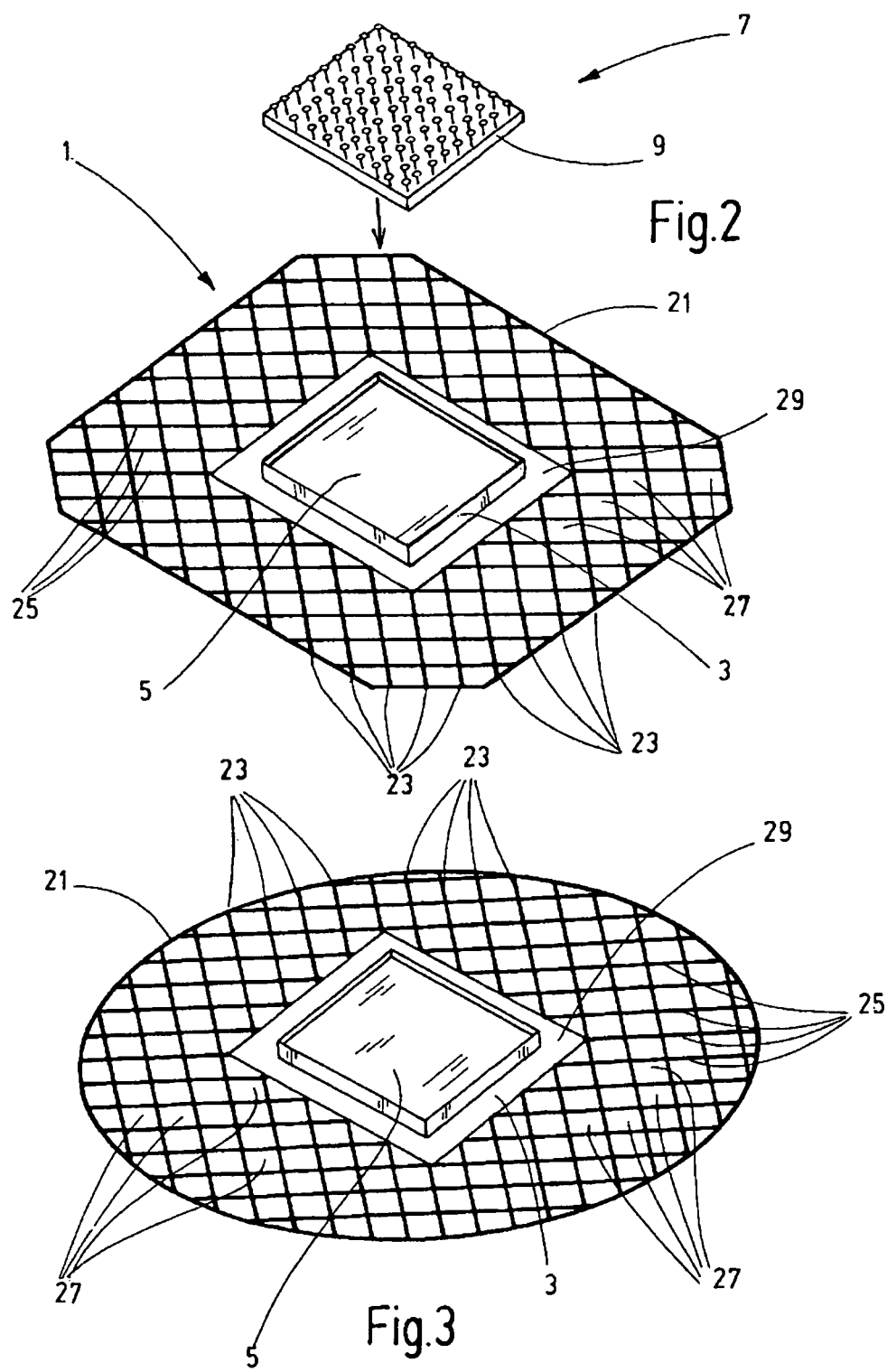

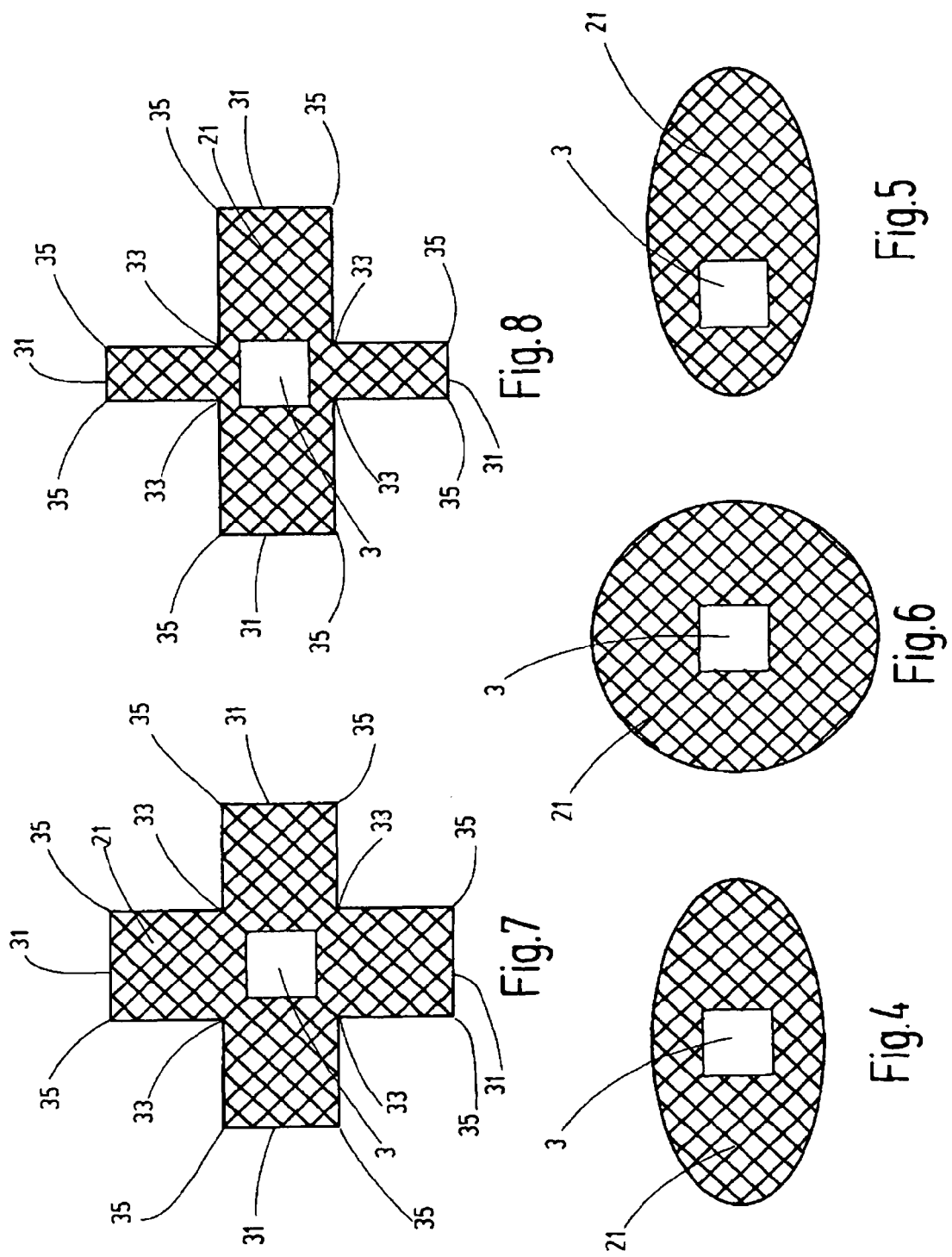

FASTENING SYSTEM

FIELD OF THE INVENTION

The invention relates to a fastening system for mounting detachable covering components, such as panels on other components such as automotive body parts, having at least one spacer that can be secured on the covering component on one side by a fastener and that is provided with a hook-and-loop-type fastening part on the opposite side. The fastening part is detachably engageable with a corresponding hook-and-loop fastening part secured on the other component.

BACKGROUND OF THE INVENTION

A fastening system of this type conforming to the prior art is disclosed in WO 2009/097950 A1. Such fastening systems serve to secure sheet-type panels in predefinable locations, for example, to conceal unattractive areas with a laminated veneer. They may also be used for thermal and sound insulation. For example, panel-type covering components may be used in automotive engineering to cover large areas of sheet metal parts as automotive body components. Loading doors, for example, may be the body parts, although body floors and roofs may also be involved. In addition to the automotive field, such fastening systems may also be used in railroads, ships and airplanes, where comparable problems must be solved.

The fastening system permits a detachable connection between the covering component and another component. Technical equipment inside the other component, such as cables, air conditioning ducts, electronic control systems, etc., may be readily accessible as needed, by removing the covering component from the other component having the respective technical equipment. The removal is accomplished by disengaging the hook-and-loop fastening parts, i.e., releasing the hook-and-loop fastener connection. In an effort to ensure secure fastening of the covering components, hook-and-loop fasteners today are designed with high holding forces. Although this design ensures the required reliability of the fastening, problems may occur in removing the components because of the high holding forces. In unfavorable cases, this problem may result in detachment of the spacer body from the covering component when the holding forces of the engaged hook-and-loop fastening parts are stronger than the holding force in effect between the fastener of the spacer body and the covering component.

SUMMARY OF THE INVENTION

An object of the present invention is to provide an improved fastening system that will permit reliable removal of the covering components despite the high holding forces in effect on the hook-and-loop fastening parts.

This object is basically achieved according to the invention by a fastening system having a flat mesh that increases the connecting portion between the covering component and spacer and that is attached to at least one edge of the side of the spacer body to be connected to the covering component. In the prior art, only the respective base area of the spacer body is available for an adhesive that is provided as the fastener. The presence of the flat mesh attached to the spacer body at the side then opens up additional possibilities for implementing a secure connection to the other component. Not only does the mesh increase the connecting portion per se, but the mesh structure with its corresponding mesh openings also permits other, more effective, connecting technologies in comparison with an adhesive connection between smooth surfaces. This mesh is therefore suitable for lamination, or foaming in place, in a covering component or for a foam lining, where form-fitting connections are created. In the case of adhesive connections with adhesives based on polyamide or with synthetic rubber adhesives, forming-fitting connections are also achieved due to the adhesive passing through the mesh openings. The hook-and-loop fastener connection can therefore be detached reliably as needed, without any risk of damage to the component to be fastened.

The mesh is preferably attached to all the edges of the rectangular spacer body. The connecting portion is then enlarged toward all sides of the spacer. The dimensions of the mesh are selected especially advantageously, so that the mesh enlarges the size of the connecting portion of the spacer with the covering component to more than twice the area of the spacer body.

The shape of the mesh can have a smooth curvature on its periphery, in particular being round or oval, or the mesh may have an angular shape. In the latter case, the mesh may also be designed to have corner angles, a few of which are open to the outside and a few of which are open to the inside, thus forming a mesh having a plurality of separate arms.

Regardless of the respective shape of the mesh, the spacer body may be situated in the central area of the connecting portion formed by the mesh or outside of this central area.

The actual mesh structure may advantageously be formed by two groups of intersecting mesh bars that are parallel in each group. The groups of mesh bars may intersect one another at right angles, so that rectangular mesh openings are formed.

In a particularly advantageous manner, the mesh may be integrally molded on the spacer body in one piece. The unitary spacer body and mesh may be a homogeneous injection-molded body or may be a plastic part with inserts of textile fibers or fiber glass cloth or metal cloth.

In advantageous embodiments, the spacer body has a protruding planar edging on the side to be connected to the covering component. The edging then is connected to the mesh in a coplanar arrangement. Therefore, in addition to the planar base area of the spacer body, a planar contact surface enlarging this area is also formed for the covering component.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 2 is an exploded perspective view of only the spacer and a respective hook-and-loop fastening part of a fastening system according to a second exemplary embodiment of the invention;

FIG. 3 is a perspective view of only the spacer of a fastening system of a third exemplary embodiment of the invention;

FIGS. 4 to 8 are simplified schematic top plan views of the spacers of fastening systems according to fourth, fifth, sixth, seventh and eighth exemplary embodiments of the invention;

DETAILED DESCRIPTION OF THE INVENTION

Figure 1:
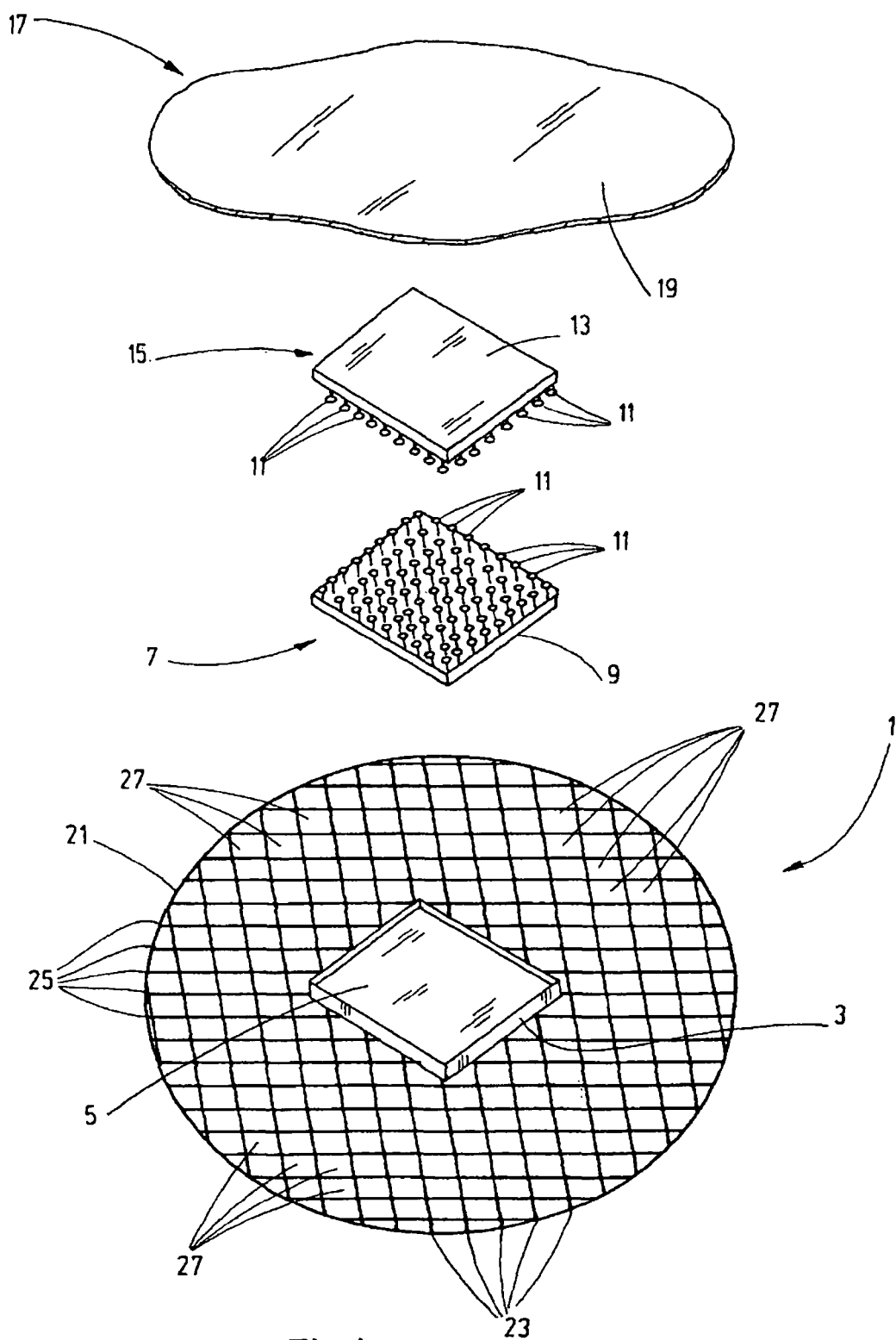
FIG. 1 is an exploded perspective view of essential parts of a fastening system according to a first exemplary embodiment of the invention.
Figure 9:
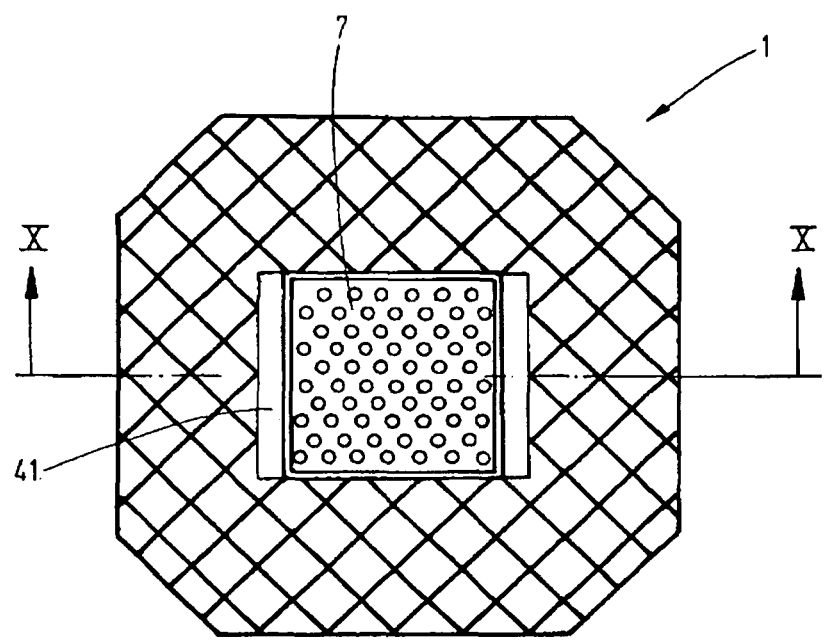
FIG. 9 is a top plan view of a spacer of a fastening system according to a ninth exemplary embodiment of the invention.
Figure 10:
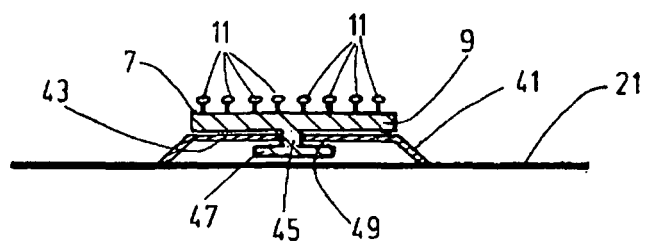
FIG. 10 is a front elevational view in section of the spacer of FIG. 9 taken along line X-X in FIG. 9.
Figure 11:
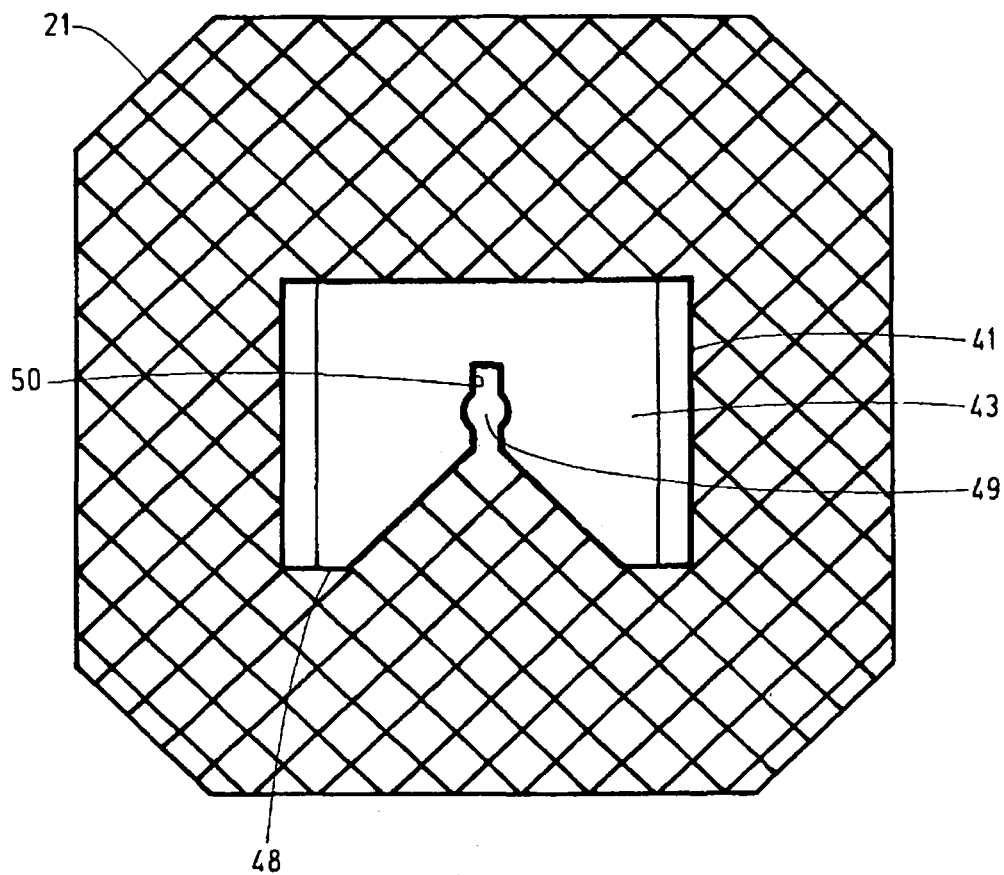
FIG. 11 is a top plan view of the spacer of FIG. 9 drawn on an enlarged scale in comparison with the FIGS. 9 and 10, but with the hook-and-loop fastening part removed from the box part of the spacer body.
Figure 12:
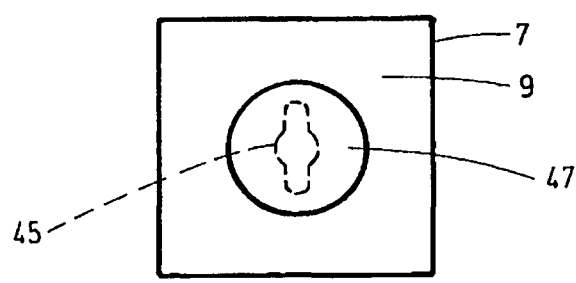
FIG. 12 is a bottom plan view of the spacer body of FIG. 11 with the hook-and-loop fastening part removed from the box part of FIG. 11 showing the underside of its backing part.

FIG. 1 shows the individual components of the fastening system made up of these components as a whole, beginning with a spacer 1 shown at the bottom of FIG. 1, fastenable to a covering component (not shown) by fastening system. The spacer 1 has a rectangular box part 3 with a frame recess 5 for accommodating, in a flush manner, a first hook-and-loop fastening part 7. Fastener part 7 has hook elements 11 in the shape of mushroom heads, on a backing layer 9. These hook elements can engage with corresponding hook elements 11 on a second hook-and-loop fastening part 15, whose backing layer 13 is fastened to the respective other component 17, body panel 19. FIG. 1 shows a flat section of an automotive body panel 19 as an example. As in the prior art, the box part 3 of the spacer 1 may be designed with a different design height to implement the desired different distances between the covering component and the other component 17.

With the fastening system according to the invention, a flat mesh 21 is the fastener for securing the spacer 1 on the covering component (not shown). This flat mesh is attached to the box part 3 and the side facing the covering component, and increases the connecting portion with the covering component beyond the size of the area of the box part 3. In the exemplary embodiment in FIG. 1, the mesh 21 is circular and surrounds the box part 3 such that the box part is situated in the area of the center of the circle. The mesh 21 is formed by two groups of mesh bars 23 and 25, intersecting one another at or almost at right angles, thereby forming rectangular mesh openings 27 shaped like the mesh bars 23 and 25 (not all of which are labeled in the drawings). The mesh 21 is designed to be relatively fine, so the number of mesh openings 27 may amount to 50 openings or even far more than 50 openings. That mesh structure is especially suitable for connection to the covering component by lamination, or foaming in place or injection in place. Adhesives may also be used. In any case, this mesh structure yields a form-fitting anchoring due to the material or the adhesive permeating the mesh openings 27. Hot-melt adhesives having a high thermal stability such as polyamide adhesives may also be used. The box part 3 is especially preferably made of an ABS material, in particular PC-ABS (polycarbonate-acrylonitrile-butadiene-styrene material). The entire spacer 1 with the box part 3 and the mesh 21 may be designed as a one-piece injection molded object made of plastic material, e.g., made of a polyamide-6 [nylon-6] material. Instead of a homogeneous injection-molded article, the box part may also be provided with an insert, such as a textile fiber material, glass fiber material or metal cloth.

FIG. 2 illustrates a modified embodiment differing from the first example in that the mesh 21 has a rectangular shape with flattened corners. As in the first exemplary embodiment, the box part 3 is positioned centrally within the connecting portion formed by the mesh 21. Another difference is that the box part 3 has a greater height than in the first example. Furthermore, the mesh 21 is not directly connected to the box part 3, but instead the box part 3 has a protruding planar edging 29 on the side connected to the covering component. The entire spacer 1 including the box part 3, edging 29 and mesh 21, is designed as a uniform injection-molded body in one piece.

In the exemplary embodiment in FIG. 3, the only difference in comparison with the example in FIG. 2 is that the mesh 21 is oval-shaped.

To provide a mesh structure that increases the connecting area, the mesh 21 may have various shapes. The box part 3 also need not necessarily be positioned in the central area of the respective mesh 21, just as the box part 3 need not have a square shape itself (as shown in the figures). Instead, box part 3 could also have a more elongated rectangular shape. FIGS. 4 through 8 illustrate a selection of possible variants of the design of the mesh 21. FIG. 4 shows a slender oval shape with the box part 3 situated in the central area, in the form of a simplified schematic diagram of the mesh 21. The example in FIG. 5 differs in comparison with the FIG. 4 example only in the decentralized position of the box part 3. FIG. 6, like FIG. 1, shows a circular mesh 21 having the box part 3 situated in the central area. Finally, FIGS. 7 and 8 show examples in which mesh bars 31 running perpendicular to one another extend from a box part 3 of a square shape situated in the central area of the connecting portion. These mesh bars extend outward from each side of the square, so that the mesh 21 forms a bar cross having corner angles 33 that are open to the outside and corner angles 35 that are open to the inside. In the example shown in FIG. 7, each bar 31 has the same width. The example in FIG. 8 differs from the FIG. 7 example in that the vertical bars 31 in the figure are narrower than the horizontal bars 31, and the width of the narrower bars 31 is less than the side length of the box part 3.

In another embodiment according to FIGS. 9 through 12, the box part 41 forming the spacer body is in the form of a trough-shaped hollow box. The backing layer 9 of the hook-and-loop fastening part 7 can be secured on the bottom 43 of the hollow box above the mesh 21 without edging. For this purpose, the backing layer 9 has a protruding retaining lug 45 with a button-type extension 47 on the free end. The bottom 43 of the box part 41 has a slot 49. Box part 41 is open on the side 48 toward which the slot 49 is open, so that the retaining lug 45 can be inserted into the slot 49. The button-type extension 47 protrudes beyond the edges 50 of the slot 49 and thereby secures the hook-and-loop fastening part 7 on the box part 41 in a form-fitting manner.

While various embodiments have been chosen to illustrate the invention, it will be understood by those skilled in the art that various changes and modifications can be made therein without departing from the scope of the invention as defined in the appended claims.

What is claimed is:

1. A fastening system for detachably mounting a covering component on another component, comprising:
   at least one spacer including a spacer body having a pre-definable installation height and having opposite first and second spacer sides;
   a fastener on said first spacer side for securing said at least one spacer to the covering component;
   a spacer hook-and-loop fastener part on said second spacer side being detachably engageable with a complementary hook-and-loop fastener part to releasably secure the covering component on the other component; and
   a flat mesh enlarging a connecting portion of said at least one spacer for connecting the covering component to said at least one spacer and extending from and being connected to at least one edge of said first spacer side, said mesh being a unitary, one-piece, homogeneous molded part of said spacer body.

2. The fastening system according to claim 1 wherein
said spacer body is rectangular; and
said mesh is connected to all edges of said spacer body.

3. The fastening system according to claim 1 wherein
said mesh increases an area of said connecting portion of said at least one spacer to more than twice an area of said first spacer side.

4. The fastening system according to claim 1 wherein
said at least one spacer comprises a periphery with a smooth curvature.

5. The fastening system according to claim 4 wherein
said curvature is circular.

6. The fastening system according to claim 4 wherein
said curvature is oval.

7. The fastening system according to claim 1 wherein
said mesh comprises a polygonal periphery.

8. The fastening system according to claim 7 wherein
said mesh comprises corner angles open toward an inside thereof and corner angles open toward an outside thereof.

9. The fastening system according to claim 1 wherein
said spacer body is situated in a central area of said mesh.

10. The fastening system according to claim 1 wherein
said spacer body is situated spaced from a central area of said mesh.

11. The fastening system according to claim 1 wherein
said mesh comprises two intersecting groups of mesh bars, said mesh bars of each said group being parallel to one another.

12. The fastening system according to claim 11 wherein
said mesh bars of one of said groups intersect said mesh bars of the other of said groups at right angles.

13. The fastening system according to claim 1 wherein
said spacer body comprises a protruding planar edging on said first spacer side connected to and coplanar to said mesh.

14. The fastening system according to claim 1 wherein
said spacer hook-and-loop fastener part comprises a backing layer having a protruding retaining lug with a button-shaped enlargement on a side of said backing layer opposite hook elements on said backing layer, said backing layer being gripped from behind edges of a slot in a hollow box part of said spacer body forming a trough, said trough having a bottom spaced from said second spacer side and spaced from a plane containing said mesh and having an open side allowing insertion of said retaining lug in said slot, said slot being formed in said bottom.

\* \* \* \* \*